United States Patent Office 2,993,919
Patented July 25, 1961

2,993,919
ALKYLOLAMINOHYDROXY FATTY MATERIALS
Thomas W. Findley, La Grange, and Burton H. Robin, Chicago, Ill., assignors to Swift & Company, Chicago, Ill., a corporation of Illinois
No Drawing. Filed Dec. 19, 1956, Ser. No. 629,235
15 Claims. (Cl. 260—404.5)

This invention relates to new and useful compositions of matter. More particularly, the present invention is concerned with the preparation of new alkylolaminohydroxy fatty materials.

There is a substantial need in modern industry for compounds which have the ability to alter the surface characteristics of liquids in which they have been dissolved. Products of this type are designated as "surface-active" materials. Because these compounds have a wide variety of uses, a considerable amount of research has been undertaken to develop new members of this group which evidence especially advantageous properties in certain applications.

One important use for particular surface-active agents, for example, lies in their employment as "collectors" in ore flotation processes. A solution containing an effective "collector" or "collectors" selectively wets certain particles of an ore concentrate. Passing air through the solution causes the unwet minerals to become attached to air bubbles and float to the surface where they are held in suspension until the separation process is completed.

(1)

$$CH_3-(CH_2)_7-\underset{\underset{OH}{|}}{CH}-\underset{\underset{Cl}{|}}{CH}-(CH_2)_7-COOH+3NH(CH_2CH_2OH)_2 \xrightarrow{\text{diethanolamine}} CH_3(CH_2)_7-\underset{\underset{OH}{|}}{CH}-\underset{\underset{N(CH_2CH_2OH)_2}{|}}{CH}(CH_2)_7CON(CH_2CH_2OH)_2+(CH_2CH_2OH)_2\overset{+}{N}H_2\ Cl^-$$

9-chloro-10-hydroxy-stearic acid          diethanolaminoamide of 9-diethanolamino-10-hydroxy-stearic acid          diethanolamine hydrochloride (2)

$$CH_3-(CH_2)_7-\underset{\underset{Cl}{|}}{CH}-\underset{\underset{OH}{|}}{CH}(CH_2)_7-COOH+3NH(CH_2CH_2OH)_2 \xrightarrow{\text{diethanolamine}} CH_3(CH_2)_7CH-(CH-(CH_2)_7CON(CH_2CH_2OH)_2+(CH_2CH_2OH)_2\overset{+}{N}H_2\ Cl^-$$

10-chloro-9-hydroxy-stearic acid with OH and N(CH₂CH₂OH)₂ on the carbons; diethanolaminoamide of 10-diethanolamino-9-hydroxy-stearic acid; diethanolamine hydrochloride It is an object of the present invention, therefore, to provide new and useful surface-active compositions of matter.

Another object of this invention is to provide a novel method of preparing new surface-active materials.

Still another object of the invention is to provide new compositions of matter which are suitable for use as ore-flotation agents.

Additional objects not specifically set forth herein will become readily apparent to those skilled in the art from the following detailed description of the invention.

In general, the present invention comprises the discovery of new compositions of matter which are suitable for use, for example, as ore flotation agents, etc. More particularly, the present invention comprises the preparation of a new group of products which have the following general formula:

$$H(CH_2)_m[\underset{\underset{W}{|}}{CH}-\underset{\underset{X}{|}}{CH}-(CH_2)_y]_n-\underset{\underset{W}{|}}{CH}-\underset{\underset{X}{|}}{CH}-(CH_2)_p-Z$$

where $m$ is an integer from 0–19, $n$ is an integer from 0–4, $p$ is an integer from 0–19, $y$ is an integer from 0–17, and where $m+2n+ny+3+p=$an integer from 10–22; where either W or X is an OH group, where W is taken from a group consisting of $-NR'R''$ and $$[-NR'R''R''']^+[An]^-$$

when X is OH, and where X is taken from a group consisting of $-NR'R''$ and $[-NR'R''R''']^+[An]^-$ when W is OH; where Z is taken from a group consisting of $CH_2OH$, $COOH$, $CONR'R''$, and $COOC_sH_{2s}NR''R'''$; where $R'$ is an alkylol group and where $R''$ and $R'''$ are taken from a group consisting of H, alkyl and alkylol;

where $s$ is an integer from 2–8; and where $[An]^-$ is an anion.

In carrying out the present invention a halohydroxy fatty material such as a fatty acid, fatty ester or fatty alcohol is reacted with an alkylolamine to form an amide, ester or alcohol having a hydroxy group and an alkylolamino group on adjacent carbon atoms along the carbon chain. The halohydroxy compound can be prepared from unsaturated fatty acids, esters or alcohols containing from 10 to 22 carbon atoms or from fats or oils having unsaturated acid radicals of from 10 to 22 carbon atoms.

The following examples show the reaction of various alkylolamines with suitable halohydroxy compounds.

EXAMPLE I

*Preparation of chlorohydroxystearic acid—diethanolamine condensate*

Fifty (50) grams of chlorohydroxystearic acid (CHSA) was mixed with sixty-two (62) grams of diethanolamine (DEA) and the resulting solution was raised to 180° C. and held at this temperature for one hour with stirring. During this time water vapor was allowed to escape as it formed. The resulting viscous oil was soluble and surface-active. The surface tensions of acid, alkali, and water solutions containing 0.1% of the condensate were 34, 36, and 32 dynes/cm., respectively.

The reactions taking place in Example I are substantially represented by the following equations:

The sulfate of the reaction product of Example I was prepared by adding an excess of $H_2SO_4$ to the condensate. Similarly, the phosphate, the nitrate, the hydrochloride, and the acetate of the reaction product were obtained by adding respectively an excess of $H_3PO_4$, $HNO_3$, HCl and $CH_3COOH$ to the condensate. Other acid salts of the amines can be made by following a similar procedure.

A portion of the reaction product was hydrolyzed back to the acid state by treating with excess hot aqueous hydrochloric acid. The product was soluble and surface-active in acid and alkali.

EXAMPLE II

*Preparation of chlorohydroxystearic acid—monoethylethanolamine condensate*

Fifty (50) grams of (9,10)(10,9)-chlorohydroxystearic acid (CHSA) was mixed with fifty-three (53) grams of monoethylethanolamine (MEEA) and the solution was refluxed at approximately 170° C. After one and one-half hours, the solution was soluble and surface-active in acid. The surface tension of a 0.1N HCl solution containing 0.1% by weight of the condensate was 34 dynes/cm.

EXAMPLE III

*Preparation of chlorohydroxystearic acid—monoisopropylethanolamine condensate*

Fifty (50) grams of (9,10)(10,9)-chlorohydroxystearic acid (CHSA) was mixed with sixty-two (62) grams of monoisopropylethanolamine (MIEA) and the solution was refluxed at approximately 170° C. After three and one-half hours, the solution was soluble and surface-active in acid. The surface tension of a 0.1N HCl solution containing 0.1% by weight of the condensate was 35 dynes/cm.

EXAMPLE IV

*Preparation of chlorohydroxystearic acid—monobutylethanolamine condensate*

Fifty (50) grams of chlorohydroxystearic acid (CHSA) was mixed with seventy (70) grams of monobutylethanolamine (MBEA) and the solution was held at 180° C. After one hour, the solution was soluble and surface-active in acid. The surface tension of a 0.1N HCl solution containing 0.1% by weight of the condensate was 36 dynes/cm.

EXAMPLE V

*Preparation of chlorohydroxystearic acid—diisopropanolamine condensate*

Fifty (50) grams of chlorohydroxystearic acid (CHSA) was mixed with eighty-two (82) grams of diisopropanolamine (DIA) and the solution was held at 180° C. After one hour, the solution was soluble and surface-active in acid. The surface tension of a 0.1N HCl solution containing 0.1% by weight of the condensate was 36 dynes/cm.

EXAMPLE VI

*Preparation of chlorohydroxystearic acid—diethanolamine condensate*

[This example illustrates the effect of preventing the escape of water vapor formed during the reaction]

Fifty (50) grams of chlorohydroxystearic acid (CHSA) was mixed with sixty-two (62) grams of diethanolamine (DEA) and the solution was held at 150° C. for twenty-four hours under reflux so that the water which formed was not removed. The product was soluble and surface-active in acid and alkali, but was not completely soluble in water.

EXAMPLE VII

*Preparation of halohydroxylated soybean oil—diethanolamine condensate*

Twenty (20) grams of chlorohydroxylated soybean oil was condensed at 180° C. with thirty-seven (37) grams of diethanolamine for one hour. The product was soluble and surface-active in acid. The surface tension of a 0.1N HCl solution containing 0.1% by weight of the condensate was 34 dynes/cm.

EXAMPLE VIII

*Preparation of bromohydroxystearic acid—diethanolamine condensate*

Eighty-nine (89) grams of bromohydroxystearic acid was mixed with ninety-three (93) grams of diethanolamine and the resulting solution was brought to 180° C. It was held at this temperature for one hour, after which the condensate was soluble and surface-active in acid. The surface tension of a 0.1N HCl solution containing 0.1% by weight of the condensate was 34 dynes/cm.

EXAMPLE IX

*Preparation of halohydroxylated oleyl alcohol—diethanolamine condensate*

One hundred (100) grams of partially hypochlorinated oleyl alcohol was mixed with one hundred (100) grams of diethanolamine and the resulting two phase mixture was brought to 180° C. After four hours the mixture was partly acid-soluble. The insoluble portion was separated, leaving a condensate which was soluble and surface-active in acid. The surface tension of a 0.1N HCl solution containing 0.1% by weight of the condensate was 35.6 dynes/cm.

EXAMPLE X

*Preparation of halohydroxylated tall oil—diethanolamine condensate*

Fifty-two (52) grams of hypochlorinated tall oil fatty acids was mixed with eighty-four (84) grams of diethanolamine and the solution was held at 180°–190° C. After one hour the product was soluble and surface-active in acid. The surface tension of a 0.1N HCl solution containing 0.1% by weight of the condensate was 34.2 dynes/cm.

EXAMPLE XI

*Preparation of halohydroxylated rapeseed oil—diethanolamine condensate*

Fifty-one (51) grams of hypochlorinated rapeseed oil was mixed with seventy (70) grams of diethanolamine and the mixture was held at 180°–190° C. After one and one-half hours the product was soluble and surface-active in acid. The surface tension of a 0.1N HCl solution containing 0.1% by weight of the condensate was 41.5 dynes/cm.

EXAMPLE XII

*Preparation of bromohydroxyundecylic acid—diethanolamine condensate*

Fifty (50) grams of 11-bromo-10-hydroxy-undecylic acid is mixed with seventy-five (75) grams of diethanolamine and the mixture is held at 180°–190° C. After one hour the product is soluble and surface-active in acid.

EXAMPLE XIII

*Preparation of chlorohydroxystearic acid—diethanolamine condensate using two moles of diethanolamine per mole of chlorohydroxystearic acid*

Fifty (50) grams of chlorohydroxystearic acid was mixed with thirty-three (33) grams of diethanolamine and the solution was held at 180° C. After two hours the product was soluble and surface-active in acid. The surface tension of a 0.1N HCl solution containing 0.1% by weight of the condensate was 35 dynes/cm.

EXAMPLE XIV

*Preparation of chlorohydroxystearic acid—monoethanolamine condensate*

Fifty (50) grams of chlorohydroxystearic acid was mixed with thirty-six (36) grams of monoethanolamine and the resulting solution was held at 180° C. After two hours the product was soluble and surface-active in acid. The surface tension of a 0.1N HCl solution containing 0.1% by weight of the condensate was 35 dynes/cm.

EXAMPLE XV

*Preparation of chlorohydroxystearic acid—triethanolamine condensate*

Fifty (50) grams of chlorohydroxystearic acid was mixed with ninety-three (93) grams of triethanolamine and the solution was held at 180° C. for five hours. The product was soluble and surface-active in acid. The surface tension of a 0.1N HCl solution containing 0.1% by weight of the condensate was 37 dynes/cm.

Halohydroxy compounds can be prepared, for example, by adding a hypohalous acid across the double bonds of an unsaturated fatty acid such as undecylenic acid, palmitoleic acid, ricinoleic acid, oleic acid, petroselinic acid, linoleic acid, linolenic acid, arachidonic acid, erucic acid, docosapentaenoic acid, etc., or across the double bonds of such fatty materials as soybean oil, castor oil, rapeseed oil, tall oil, tallow, grease, unsaturated fatty alcohols, etc. Reactions of this type are well known in the art and are discussed in the following publications:

Albitzky, J. Prakt. Chem., 1900, 61, 65
Nicolet and Poulter, J.A.C.S., 52, 1186 (1930)
Atherton and Hilditch, J.C.S., 1943, 204
Swern, J.A.C.S., 70, 1235 (1948)
Naudet, Bull. Soc. Chim. France, 1950, 842

Other halogens, such as iodine, can be used instead of chlorine and bromine in forming the halohydroxylated fatty compounds. The fact that bromine and to a greater extent chlorine are less expensive than other members of the group makes them more feasible starting materials from a commercial point of view.

It has been found that products which conform to the general formula described above have many uses, due to their surface activity. A specific application lies in their ability to separate one mineral from another in flotation operations, such as in separating silica from phosphate rock.

In phosphate rock mining the phosphate leaves the mine in the form of a slurry which is composed of about one-third coarse particles, one-third "fines," and one-third "slimes." In the past, only the coarse particles were saved because of the necessity of producing a low silica product. Recent improvements in separation methods, however, now make it possible to remove a sufficient amount of sand from the "fines" to justify retaining this material. The "slimes" of the slurry are still discarded since they consist mainly of clay and contain little phosphate.

A two stage flotation process is usually employed to remove sand from the "fines." In the primary step, an anionic agent such as tall oil soap is added to the slurry of "fines" along with excess caustic and crude oil and the mixture is aerated in a Denver cell. This treatment produces a froth having a solids content of about 85–90 percent bone phosphate of lime, in addition to approximately 8 percent silica. The secondary float is accomplished by adding a surface-active cationic agent to the primary concentrate.

The compounds of the present invention were found to be very effective in this second separation step as is indicated from the following tests.

EXAMPLE XVI

*Use of chlorohydroxystearic acid—diethanolamine reaction product as an ore flotation agent*

A condensate prepared as in Example I was freed of excess diethanolamine and excess diethanolamine hydrochloride by washing the material with a saturated sodium sulfate solution. Four-tenths (0.4) of a pound of dried condensate and eight-hundredths (0.08) of a pound of glacial acetic acid per ton of primary concentrate were added to the concentrate and the mixture was aerated in a Denver cell. Due to its cationic properties, the condensate caused most of the $SiO_2$ to be carried out of the cell in the froth. An analysis of the residue showed that it now contained only 2.68% silica.

EXAMPLE XVII

*Use of chlorohydroxystearic acid—diethanolamine reaction product as a flotation agent where the product is prepared using two moles of the alkylolamine to one mole of the halohydroxy compound*

Six-tenths (0.6) of a pound of a product prepared as in Example XIII and twelve-hundredths (0.12) of a pound of glacial acetic acid per ton of primary concentrate were added to the concentrate and the mixture was aerated in a Denver cell. The residue which remained in the cell after the flotation step contained 2.03 percent silica.

The following chart shows the effect of one of the compounds of the present invention on the surface tension of various solutions:

SURFACE TENSION MEASUREMENTS

| | Dynes/cm. |
|---|---|
| Distilled water | 71 |
| Distilled water + 0.1% chlorohydroxystearic acid—diethanolamine reaction product | 32 |
| 10% $H_2SO_4$ solution | 71 |
| 10% $H_2SO_4$+0.1% chlorohydroxystearic acid—diethanolamine reaction product | 33 |
| 10% $H_3PO_4$ solution | 58 |
| 10% $H_3PO_4$+0.1% chlorohydroxystearic acid—diethanolamine reaction product | 34 |
| 10% HCl solution | 71 |
| 10% HCl+0.1% chlorohydroxystearic acid—diethanolamine reaction product | 32 |

One of the essential features of the present invention is that the hydroxy and alkylolamino groups of the resultant product must be located on adjacent carbon atoms along the carbon chain. It is also necessary that hydroxy groups be present on the alkyl chain of the amine in order to add unique solubilizing characteristics to the compounds which gives the invention a much wider range of applicability.

Although the particular temperatures used in carrying out the reactions of the present invention are not considered critical, the preferred range is from about 150° C. to about 220° C. Greater or lesser temperatures may be used but very substantial deviations from the above range would either greatly lengthen reaction times or would produce undesired side reactions.

Theoretically, two moles of the alkylolamine should be used for each mole of the halohydroxy compound where the compound is in its free acid or ester state. It has been found, however, that the reaction proceeds more rapidly and efficiently if the mole ratio is increased to four to one. This provides one mole of the alkylolamine to form the amide, one mole of the alkylolamine to replace the halogen atom on the chain, one mole to neutralize the HCl or HBr formed in the reaction, and one additional mole of the alkylolamine to drive the reaction toward completion.

The reaction of an alkylolamine with a halohydroxy acid results principally in the formation of an amide although a portion of the product may be an ester. When the either the amide or the ester is treated with excess hot aqueous mineral acid it will be hydrolyzed to the free acid state. If the starting material is a halohydroxy fatty alcohol, the final product will be an alkylolaminohydroxy fatty alcohol.

Obviously many modifications and variations of the invention as hereinbefore set forth may be made without departing from the spirit and scope thereof, and therefore only such limitations should be imposed as are indicated in the appended claims.

We claim:

1. A surface-active composition of matter characterized by having from 10 to 22 carbon atoms in an alkyl chain and having an OH group and a lower alkylolamino group attached to adjacent carbon atoms on said carbon chain which composition of matter is selected from the group consisting of fatty acids, fatty alcohols, fatty esters, fatty amides, and salts thereof.

2. A surface-active composition of matter as set forth in claim 1 where the composition of matter is 9,10(10,9)-hydroxyalkylolaminostearic acid.

3. A surface-active composition of matter as set forth in claim 1 where the composition of matter is the lower alkylolamide of 9,10(10,9)hydroxyalkylolaminostearic acid.

4. A surface-active composition of matter as set forth in claim 1 where the composition of matter is the lower aminoalkylol ester of 9,10(10,9)hydroxyalkylolaminostearic acid.

5. A surface-active composition of matter as set forth in claim 1 wherein the composition of matter is 9,10-(10,9)hydroxyalkylolaminostearyl alcohol.

6. A process which comprises reacting a lower alkylolamine with halohydroxylated straight-chain fatty compound having from 10 to 22 carbon atoms in its carbon chain, said halogen and hydroxyl groups being attached to adjacent carbon atoms along the carbon chain of said fatty compound, said fatty compound having 1–5 halohydroxy groups.

7. A process according to claim 6 in which the fatty compound is a halohydroxylated fatty acid having from 10 to 22 carbon atoms in its carbon chain.

8. A process according to claim 6 where the fatty compound is a straight-chain halohydroxylated fatty alcohol having from 10 to 22 carbon atoms in its carbon chain.

9. A process according to claim 6 where the fatty compound is a halohydroxylated fatty ester having from 10 to 22 carbon atoms in its carbon chain.

10. A process according to claim 6 where the fatty compound is halohydroxylated soybean oil.

11. A process according to claim 6 where the fatty compound is halohydroxylated tall oil.

12. A process according to claim 6 where the fatty compound is halohydroxylated rapeseed oil.

13. A process according to claim 6 where the fatty compound is halohydroxylated tallow.

14. A process according to claim 6 where the fatty compound is halohydroxystearic acid.

15. A process according to claim 6 where the halogen of the halohydroxylated fatty compound is selected from the group consisting of bromine and chlorine.

References Cited in the file of this patent

UNITED STATES PATENTS

| | | |
|---|---|---|
| 2,277,016 | Guest | Mar. 17, 1942 |
| 2,540,678 | Kelley | Feb. 6, 1951 |